Feb. 13, 1934.    G. BLACKSTOCK    1,947,374
SEMIAUTOMATIC ROLLER CLUTCH TRANSMISSION
Filed July 9, 1931    2 Sheets-Sheet 1

INVENTOR
G. BLACKSTOCK.
BY
ATTORNEYS.

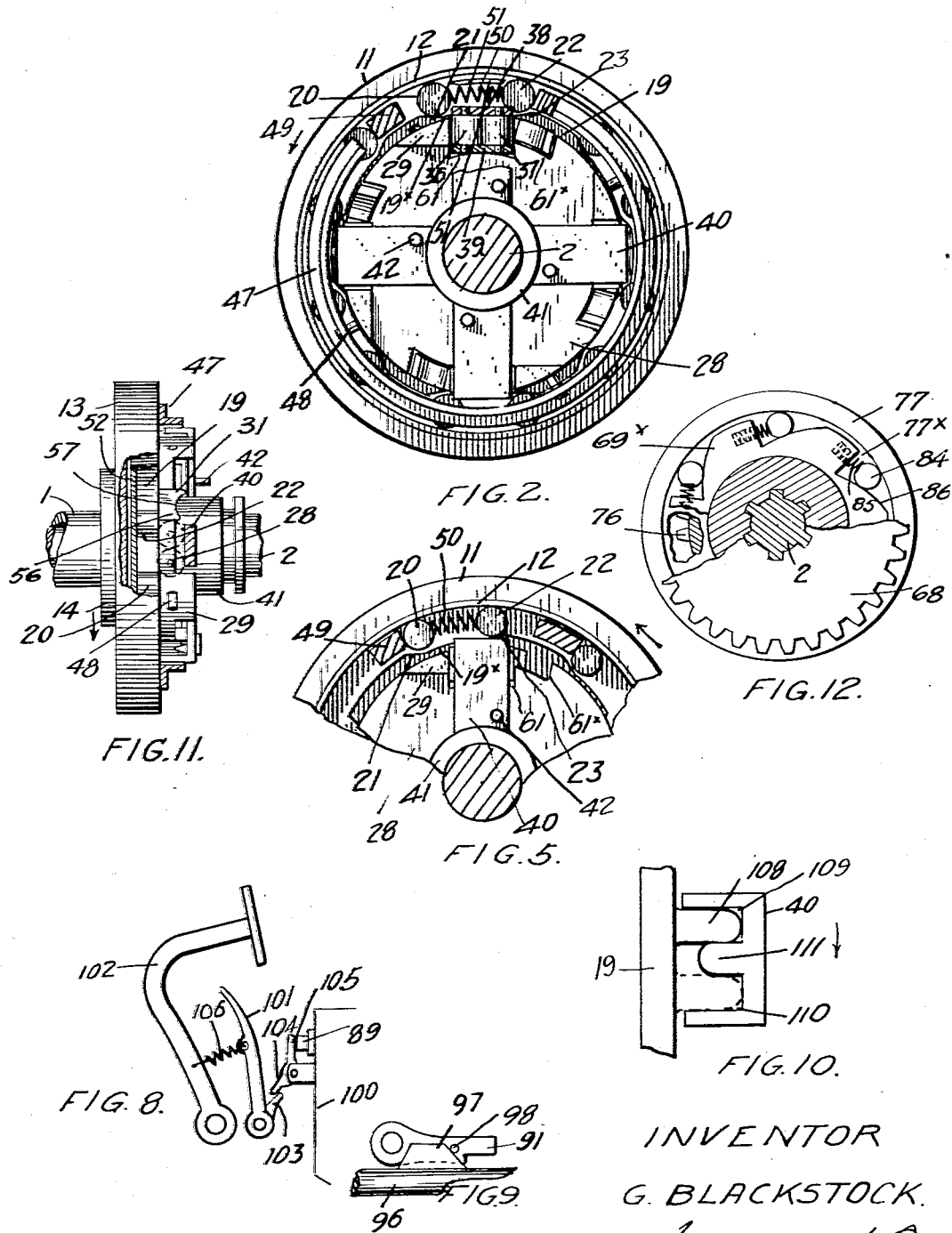

Patented Feb. 13, 1934

1,947,374

UNITED STATES PATENT OFFICE 1,947,374

SEMIAUTOMATIC ROLLER CLUTCH TRANSMISSION

Gibbs Blackstock, Toronto, Ontario, Canada

Application July 9, 1931. Serial No. 549,748

8 Claims. (Cl. 192—47)

My invention relates to semi-automatic free-wheel clutch transmissions, and the primary object is to provide a free wheel clutch which sets itself in a driving condition on synchronization of its main parts, and can be released by simple means, controlled by an operator, such as a button or pedal. More particularly I use a free wheeling roller clutch having mechanism by which this release can be effected with minimal effort even under full load.

Further objects are to incorporate such a clutch in a transmission to obtain essentially automatic gear changing, particularly in motor vehicles; and as will appear below, to provide generally for smooth and efficient working.

Although the clutch parts may be variously arranged, the drum or ring member is preferably the driving part and there are two sets of rollers, drive and catch rollers coacting with oppositely facing wedges on a floating wedge member which has an arc of mutual freedom with respect to the driven part.

On the driven part there is a sliding member which can lock the floating member in the driving position at one end of its arc, with the drive rollers operative while the catch rollers are held out of action by a set of blocks called "striker blocks" the clutch being able to free wheel or transmit normal drive.

It is released by giving a momentary axial kick to the sliding member which causes it to unlock the floating member which is then carried to the release position by the advance of the driving part. During this motion the striker blocks allow the catch rollers to return to their coacting wedges and strike the drive rollers "off".

This action takes place after the floating wedge member has been unlocked and is advancing freely and so when there can be no load on the parts.

The clutch is thrown into the driving condition by retardation of the driving part. On synchronization of the main parts the catch rollers grip and return the floating member to the driving position where it becomes locked by the sliding member. During this return motion the drive rollers return to their wedges and the catch rollers are struck "off" and the clutch free wheels until power is again applied.

Preferably and to facilitate release under load, the sliding member has a pair of anti-friction wheels which can roll on each other between parallel faced projections on the floating and driven parts. When these rolling pins (as they may be called to distinguish them from the clutch rollers) are rolled away from between the projections the floating member can advance to the release position.

As they are frictionless they can easily be rolled away even under full load, after which the floating member advances without effort so that there is no load at all on the clutch rollers as they are struck off.

When the floating member returns to the driving position the rolling pins are pressed by spring action into the pocket formed between the parallel projections.

In the complete transmission the clutch, as a high gear or direct drive, is combined with a free wheel gear train of lower ratio (and with whatever sliding gears of ordinary type are required for reverse, low gear, braking torque, etc.) and connected to a pedal or button for operating the sliding member.

The change down is made by releasing the direct drive clutch (pressing button or pedal while throttle is open), the lower free wheel train then taking the drive. The change up is made by simply throttling for an instant, the retardation of the drive shaft sets the direct clutch in the drive condition in which it free wheels until power is again applied.

Fig. 2 is a rear view of the clutch in the driving condition.

Figures 1, 3, 4:
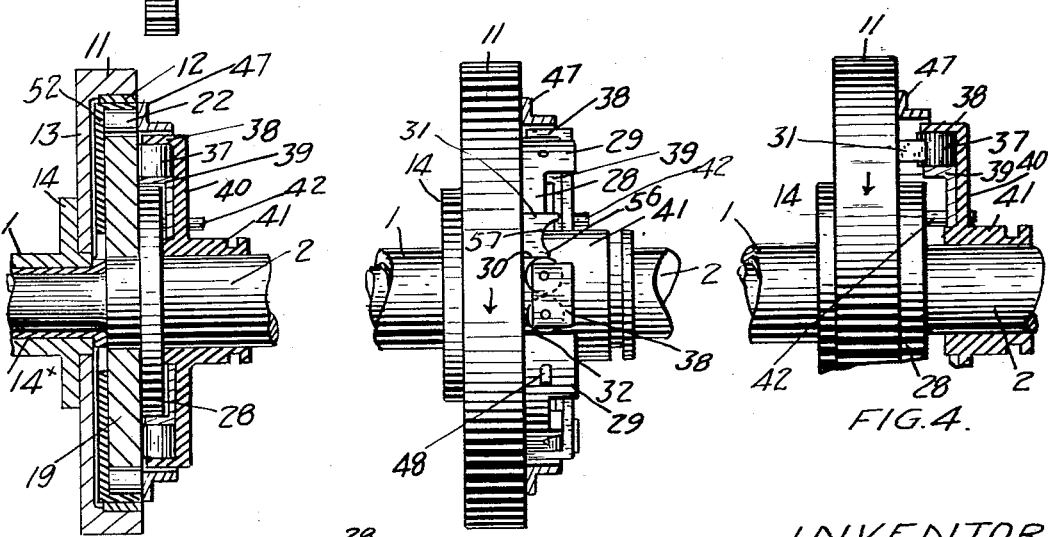
Fig. 1 is a sectional view of the clutch.
Fig. 3 is a side view of the clutch.
Figure 6:
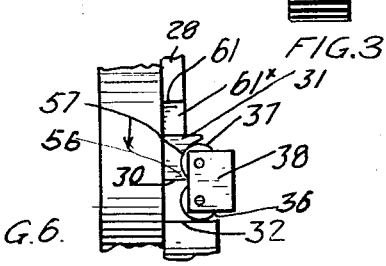

Figs. 4, 5 and 6 corresponding respectively to Figs. 1, 2 and 3 show the parts in the released condition.

Figure 7:
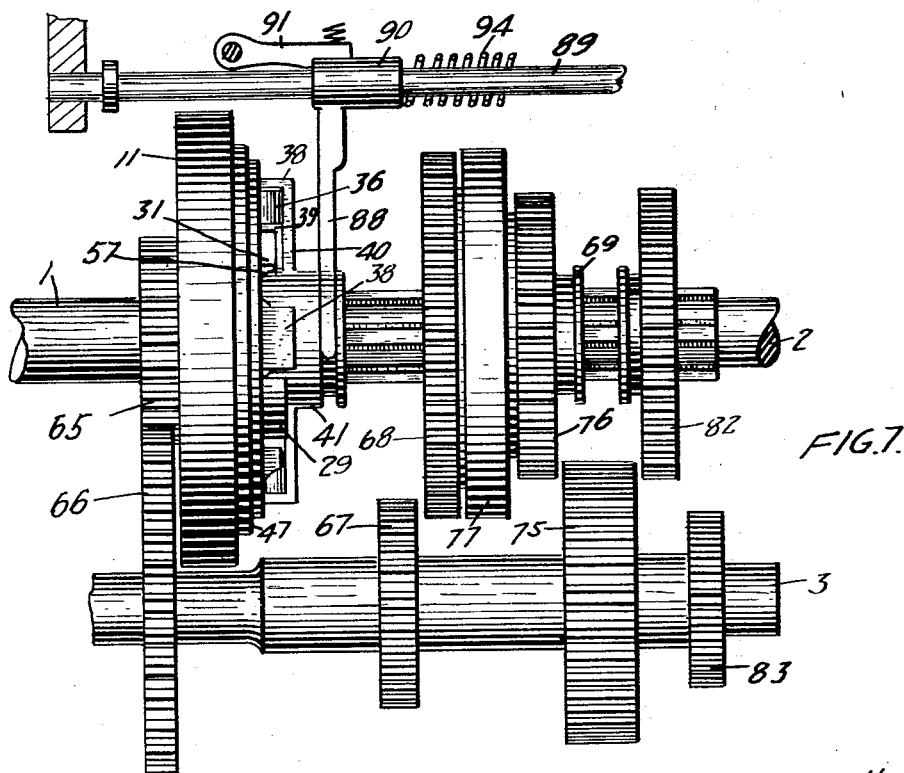

Fig. 7 shows the clutch incorporated in a transmission.

Fig. 8 shows the pedal means for operating the clutch.

Fig. 9 shows a way of releasing a latch shown in Fig. 7.

Fig. 10 illustrates an alternative way of locking the floating member.

Fig. 11 is a similar view to Fig. 3 with parts broken away to show the connection between parts 31 and 19.

Fig. 12 shows a front view of the free wheel element in an intermediate gear train, and adjacent parts, with parts of the gear 68 etc., broken away to more clearly indicate the construction.

"Forward" and "backward" are used of rotation with and against the arrows which show the normal direction. The front is to the left of Fig. 1.

In the drawings like characters of reference indicate corresponding parts in each figure.

Referring to Figs. 1, 2 and 3 the clutch may be supposed to be engaged.

1 is a drive shaft provided with a flange 14 and a longitudinally extending end bearing orifice 14×. 13 is a web secured to the flange 14 and carrying an annular flange or drum 11, forming a driving member which may be provided with a hardened lining 12. 2 is a driven shaft provided with a reduced portion journalled in the orifice 14× and provided with an annular flange 28. Cut in this flange are peripheral recesses 61, at one end of each recess is a peripheral extension 61× and at the other end a segmental projection 29.

19 is a floating member freely mounted on the driven shaft adjacent to the flange 28 and provided with shallow recesses 19× having opposing inclined ends forming wedging faces 21 and 23. 20 are the drive rollers coacting with the wedging surfaces, 21 and 22 are the catch rollers coacting with the wedging surfaces 23. The rollers 20 and 22 are alternately jammed between the driving member 11 and their respective wedging faces 21 and 23. 31 are projections integral with the floating member 19. This is made clear in view Fig. 11 in which the parts are broken away to more clearly indicate the structure in this relation.

41 is a hub slidably mounted on the driven shaft 2 and restrained from turning around such driven shaft by pins 42 extending from the flange 28 of the driven shaft and freely through loose fit holes in the arms 40 of the hub 41. 38 and 39 are forwardly extending portions carried by each arm 40 and spaced apart to receive rolling pins 36 and 37 which are journalled therebetween and gripped in their normal position between the opposing faces 30 and 32 of the projections 31 and 29 so that they transmit the drive downward in Fig. 3 with the arrow from the floating member 19 to the driven part 29. The arms 40 and hub 41 form only a carrier and not a torque transmitting member. The projections 31, as above described, are integral with the floating member 19, as seen in Figure 3 they project from under drum 11 and the ring 47, where the rolling pins may be seen between the parallel axially disposed faces 30 and 32 (on 31 and 29 respectively). Power goes with the arrow from 31 and 30 (part of 19) across rolling pins 37 and 36 to 32 and 29, which is secured to the driven shaft 2 by the flange 28.

A ring 47 is secured to the driven part of the clutch (as by the studs 48 in Figure 2 which go through it into the driven flange 28, 29) and has integral striker blocks 49 which when the floating member is in the drive position hold the catch rollers 22 off the catch wedges 23 against the weak springs 50. These springs are retained by the light flanges 51 extending from the disc 52 secured to the wedge member 19.

If the drive shaft is retarded the rollers 20 slip, the catch rollers 22 cannot grip and so the clutch free wheels. To keep the rolling pins 36, 37 from working their way out of the pocket formed between the faces 30 and 32 and to move the sliding member 41 etc., when required there is a fork shown in Fig. 7 and described below which works in the groove shown in the hub 41.

To release the clutch the sliding carrier is given a momentary kick to the right while there is some load on the clutch. The rolling pins 36, 37 move away without friction and the floating member is then carried with the arrow to the release position shown in Figs. 5 and 6. Its motion relative to the driven member and striker blocks 49 allows the catch rollers 22 to return to the wedging faces 23 just before the rolling pin 37 rolls over the apex of the spur 56 on the projection 31 extending from the floating member and as the rolling pin 37 moves into the pocket 57 the drive rollers 20 are struck off. The carrier 40, 41 is subject to spring pressure toward the left as explained below so that the rolling pin 37 is pressed into the pocket 57 this holding the parts in the release position. No matter how great the load the rolling pins slide easily on the parallel faces 30 and 32 and, as the rollers 20 are struck off after the floating member has been unlocked and is advancing freely, there can be no load on them at the time.

The clutch is reset in the driving condition by retarding the drive shaft. When the drum 11 falls to the speed of the other parts the catch rollers 22 grip and turn the floating member back to the driving position from the state of Figs. 5 and 6 to that of Figs. 2 and 3. The rolling pin 37 moves out of the pocket 57 with little resistance and then it and its mate are pressed into the pocket between the faces 30 and 32. The drive rollers 20 return to their wedges and the catch rollers 22 are struck off. The backward motion of the floating member is limited to that necessary to allow the rolling pins 36 and 37 to enter the pocket by the rear face of the projection 31 meeting the face 61 of the recess formed in the flange 28. The clutch now free wheels until power is applied.

I will now describe the clutch incorporated in the transmission.

Any kind of transmission with higher gear drive in which this clutch forms a link and a free wheel gear train of lower ratio can be made to act as a substantially automatic change gear system, the change to lower gear taking place when the clutch is released after which the lower free wheel train takes the drive. The change up is effected by throttling the engine, the lower gear train free wheeling and the higher going into driving condition. With a motor car it is advisable to add reversing gears and other gears to give drives of different ratio for starting, emergencies and using the engine as a brake.

The transmision shown in Fig. 7 is much like a three speed sliding gear set in which the clutch described replaces the direct drive and which has an additional second gear train with a free wheel element in it.

The shaft 3 is driven at reduced speed from the drive shaft 1 through the gears 65 and 66.

For first gear drive the sliding gear 68 integral with the grooved hub 69 is meshed with the gear 67 on the countershaft by the usual shifting means, omitted for clarity. For reverse the sliding gear 82 meshes with a reversing gear driven from the gear 83 and not shown, being out of the plane of section. A second gear drive of ordinary type is provided by meshing the gear 82 with the gear 75 on the countershaft, this train being for using the engine as a brake. The gear 76 is freely mounted on the hub 69 and between it and the splined gear 68 is a plain free wheel clutch of which 77 may represent the drum. When the gear 76 is meshed with the gear 75 the gear changing between it and the direct drive clutch becomes essentially automatic.

The free wheel drive 75, 76 etc., is an additional second gear drive having the same ratio as the ordinary one 75, 82. Figure 12 shows how the simple free wheel element and adjacent parts are carried on the splined hub 69. The gear 68, and the wedging member 69× of the free wheel unit are integral with the hub 69. Freely mounted is the gear 76 with which the ring 77 and connecting web 77ˣ are integral. The rollers 84 are gently pressed on the wedge cams 86 by weak springs 85.

88 is a fork engaging the groove in the sliding member 41, its hub 90 being secured to the rod 89 and pressed to the left by a spring 94 of moderate strength. Except when the free wheel train 75, 76 is meshed this hub is held by a latch 91 so that the rolling pins 36, 37 cannot move to the left far enough to get completely between the faces 30 and 32, and so the clutch cannot engage. When the free wheel train is meshed the latch is lifted by the device in the sketch Fig. 9. There 96 is a sliding rod which moves the fork shifting the splined hub 69. When this moves to the right the cam 97 acting on the pin 98 lifts the latch 91. The sliding member 41 and rolling pins 36, 37 can move to the left as soon as the floating member is in the driving position.

Preferably the rod 89 is actuated by the pedal means shown in Fig. 8. There 100 is the gear box from which the rod 89 protrudes when it moves to the left. 101 is a light pedal and 103, 104 and 105 levers which press the rod 89 to the right when the pedal is kicked, it being preferably connected to the engine clutch pedal 102 by a spring 106, stronger than 94, so that the rod 89 is pushed and the roller clutch released when the free wheel gear 76 is meshed.

If the car can be started in second gear this train is meshed right away, if not the start is made in first (68, 67) and the change made as soon as the car is moving by a straight push on the gear lever, which would be used for manually shifting the gear unit 69 etc. The free wheel gear takes the drive, the roller clutch releasing as mentioned above. The change to direct drive is made by throttling for a second, when the retardation of the drive shaft throws the direct drive clutch into the driving condition. The change down is effected by a light kick on the pedal 101, while the throttle is open full or slightly, when the direct drive clutch releases and the free wheel second gear takes the drive.

Changes to either of the ordinary gears 68, 67 or 82, 75 are made in the usual manner. The operator of the clutch pedal 102 moves the rod 89 to the right and the latch 91 holds it there and the roller clutch is inoperative until the free wheel gear is again meshed. When the gears are moved into neutral the motion of the engine clutch pedal similarly throws the roller clutch out of action.

With the gears shown in Fig. 7 the engine can be used as a brake through the first gear train and one of the second gear ones 82, 75 but not through third or direct. By alterations or additions of sliding gears braking torque can be transmitted in any desired ratio. One of such gear trains may have a one to one ratio, being the equivalent of a positive direct lock.

Since the roller clutch can free wheel it can be used in an intermediate gear train, free wheeling when a higher drive is in action. If there is another such clutch in this higher drive and a free wheel gear of lower ratio, then essentially automatic change between three gears is obtained.

The latch 91 is not actually necessary for the working of the clutch or transmission but it affords a simple way of holding the clutch out of action and facilitates starting the engine by hand and pushing the car about.

It is advisable to limit the push which the rod 89 receives from the pedals and lever 105 to that required to move the rolling pin 37 far enough to begin to roll over the spur 56. The fork, rod and rollers can, of course, move farther to the right so that the roller can clear the spur 56. Then, even if the clutch pedal is held down too long the rolling pin 37 tends to stay definitely on one side or other of the spur 56 and holds the floating member to one side or the other so that both sets of rollers 20 and 22 are not on at once, which would let one set of them chatter. The limit of this imposed push is indicated in Fig. 8 by the short projection of the rod 89.

One advantage of linking the rod 89 to the clutch pedal is that the roller clutch cannot be overloaded by letting the pedal up too suddenly, as it will be released in the process if the engine is running too fast. If the engine is running slowly the roller clutch will free wheel.

The great value of the frictionless sliding member is that it allows such easy release under full load. The clutch parts could be operated without the anti-friction device but to let the parts slide the load would have to be eased, as by throttling first, then kicking the pedal 101 and opening the throttle at the same time, or by pressing the engine clutch pedal 102 with the throttle slightly open, the partial opening of the engine clutch would ease the load and then the spring 106 would assert itself. If the rolling pins 36 and 37 are removed their place may be taken by a tongue and the sliding member made into the driven member by mounting it on splines on the driven shaft.

In Fig. 10 the pins 36 and 37 are replaced by the tongue 111 on the arm 40, the projection 31 on the wedge member 19 by the tooth 108 which can enter the pockets 109 and 110 on either side of the tongue 111, and move from one to the other as the sliding member 40, etc. is kicked to the right. If the teeth 108 and 111 are as shown the former can be locked in the release pocket 110, and if the driving part is retarded the catch rollers 22, see Fig. 5, will grip and the clutch transmit reverse torque. In other words the engine can be used as a brake. If the forward face of 111 and rear face of 108 are bevelled the clutch will go to the drive position automatically, as with the rolling pins, the sliding member 40 receiving a push to the right.

The splined sliding member allows the engine to be used as a brake, but it requires a punch of the engine clutch pedal to throw the roller clutch into the driving condition as well as to release it, while the frictionless sliding member, while not easily adapted to transmit braking torque, releases even under full load by a light touch on a pedal or button and re-engages of its own accord.

As long as the sliding member can be moved to unlock the floating member, it is not necessary that the motion should be imparted in the manner disclosed; within the spirit of the invention any known method may be used for actuating this unlocking motion.

What I claim as my invention is:

1. In a roller clutch transmission device, the combination with main driving and driven parts, of a floating member to which one of the said main parts is adjacent, these floating and adjacent members having a limited arc of mutual freedom, roller clutch parts between the floating member and the other of the said main parts adapted to assume a driving condition in which they can transmit the drive and a released condition in which they cannot, mechanism controlled by the position of the floating member in the said arc for maintaining the roller clutch parts in the driving condition when the floating member is in the drive position at one end of the arc and in the released condition when it is at the other end of the arc in the release position, means for locking the floating member in the drive position, and means by which an operator can unlock it to allow the advance of the main driving part to carry it to the release position.

2. In a roller clutch transmission device, the combination with main driving and driven parts, of a floating member to which one of the said main parts is adjacent, these floating and adjacent members having a limited arc of mutual freedom, roller clutch parts between the floating member and the other of the said main parts adapted to assume a driving condition in which they can transmit the drive and a released condition in which they cannot, mechanism controlled by the position of the floating member in the said arc for maintaining the roller clutch parts in the driving condition when the floating member is in the drive position at one end of the arc and in the released condition when it is at the other end of the arc in the release position, means for locking the floating member in the drive position, means by which an operator can unlock it to allow the advance of the main driving part to carry it to the release position, and a catch device actuated by synchronization of the main parts and retardation of the driving part adapted to return the floating member to the drive position.

3. In a roller clutch transmission device, the combination with main driving and driven parts, of a floating member to which one of the said main parts is adjacent, these floating and adjacent members having a limited arc of mutual freedom, roller clutch parts between the floating member and the other of the said main parts adapted to assume a driving condition in which they can transmit the drive and a released condition in which they cannot, mechanism controlled by the position of the floating member in the said arc for maintaining the roller clutch parts in the driving condition when the floating member is in the drive position at one end of the arc and in the released condition when it is at the other end of the arc in the released position, means for locking the floating member in the drive position, means by which an operator can unlock it to allow the advance of the main driving part to carry it to the release position, said roller clutch parts including rollers and two sets of oppositely inclined wedging cams on the floating member namely drive and catch cams, and the above mentioned mechanism including abutments on the said adjacent member spaced so as to allow rollers to contact with the drive cams only when the floating member is in the drive position and with only the catch cams when it is in the release position.

4. In a roller clutch transmission device, the combination with main driving and driven parts, of a floating member to which one of the said main parts is adjacent, these floating and adjacent members having a limited arc of mutual freedom, roller clutch parts between the floating member and the other of the said main parts adapted to assume a driving condition in which they can transmit the drive and a released condition in which they cannot, mechanism controlled by the position of the floating member in the said arc for maintaining the roller clutch parts in the driving condition when the floating member is in the drive position at one end of the arc and in the released condition when it is at the other end of the arc in the released position, means for locking the floating member in the drive position, means by which an operator can unlock it to allow the advance of the main driving part to carry it to the release position, the said locking means including an axially sliding member on the aforesaid adjacent member, movable one way to automatically lock the floating member in the drive position and movable the other way to unlock it.

5. In a roller clutch transmission device, the combination with main driving and driven parts, of a floating member to which one of the said main parts is adjacent, these floating and adjacent members having a limited arc of mutual freedom, roller clutch parts between the floating member and the other of the said main parts adapted to assume a driving condition in which they can transmit the drive and a released condition in which they cannot, mechanism controlled by the position of the floating member in the said arc for maintaining the roller clutch parts in the driving condition when the floating member is in the drive position at one end of the arc and in the released condition when it is at the other end of the arc in the release position, means for locking the floating member in the drive position, means by which an operator can unlock it to allow the advance of the main driving part to carry it to the release position, the said locking means including an axially sliding member on the adjacent member, movable one way to automatically lock the floating member in the driving position and movable the other way to unlock it, and antifriction means by which the sliding member can be moved to unlock with relatively slight effort even with the device under full load.

6. In a roller clutch transmission device, the combination with main driving and driven parts, of a floating member to which one of the said main parts is adjacent, these floating and adjacent members having a limited arc of mutual freedom, roller clutch parts between the floating member and the other of the said main parts adapted to assume a driving condition in which they can transmit the drive and a released condition in which they cannot, mechanism controlled by the position of the floating member in the said arc for maintaining the roller clutch parts in the driving condition when the floating member is in the drive position at one end of the arc and in the released condition when it is at the other end of the arc in the released position, means for locking the floating member in the drive position, means by which an operator can unlock it to allow the advance of the main driving part to carry it to the release position, the said locking means including axially disposed parallel faced projections on the floating member and on the adjacent member, an axially sliding carrier and a pair of rolling members thereon adapted to roll (on each other) in between the said projections to lock the floating member in the drive position as the carrier moves one way and to roll away from between them as the carrier moves the other way to unlock.

7. In a free wheel clutch device, the combination with main parts between which torque is to be transmitted, of a floating torque member adapted to have an arc of freedom with respect to one of the main parts, free wheel clutching parts between the floating member and the other main part, mechanism controlled by position of the floating member in the said arc adapted to hold the clutching parts in torque transmitting condition when the floating member is in the operative position at one end of the arc and to release them as it moves to the release position at the other end, means for locking the floating member in the operative position, and means controllable by an operator for unlocking it to allow relative motion of the main parts in the direction of normal torque transmission to carry it freely to the release position.

3. In a free wheel clutch device, the combination with main parts between which torque is to be transmitted, of a floating torque member adapted to have an arc of freedom with respect to an adjacent one of the main parts, free wheel clutching parts between the floating member and the other main part, mechanism controlled by position of the floating member in the said arc adapted to hold the clutching parts in torque transmitting condition when the floating member is in the operative position at one end of the arc and to release them as it moves to the release position at the other end, a catch device between the said other main part and the floating member actuated by relative motion of the main parts in a direction opposite to that of normal torque transmission to move the floating member to the operative position, a locking device between the floating member and the said adjacent main part adapted to lock the floating member automatically in the said operative position and to unlock it to allow relative motion of the main parts in a direction opposite to that of normal torque transmission to carry it freely to the release position, anti-friction means associated with the locking device adjusted to permit such unlocking with relatively slight effort even when the clutch is under load, and means controllable by an operator for actuating the locking device to unlock.

GIBBS BLACKSTOCK.